US012598450B2

(12) United States Patent (10) Patent No.: US 12,598,450 B2
Song (45) Date of Patent: Apr. 7, 2026

(54) METHOD AND DEVICE FOR AUGMENTING DATA IN M2M SYSTEM

(71) Applicants:Hyundai Motor Company, Seoul (KR); Kia Corporation, Seoul (KR); Industry Academy Cooperation Foundation of Sejong University, Seoul (KR)

(72) Inventor: Jae Seung Song, Seoul (KR)

(73) Assignees: Hyundai Motor Company, Seoul (KR); Kia Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 317 days.

(21) Appl. No.: 18/279,357

(22) PCT Filed: Apr. 12, 2022

(86) PCT No.: PCT/KR2022/005291
§ 371 (c)(1),
(2) Date: Aug. 29, 2023

(87) PCT Pub. No.: WO2022/239977
PCT Pub. Date: Nov. 17, 2022

(65) Prior Publication Data
US 2024/0171950 A1 May 23, 2024

Related U.S. Application Data

(60) Provisional application No. 63/186,390, filed on May 10, 2021.

(51) Int. Cl.
H04W 4/70 (2018.01)
G06T 3/00 (2024.01)

(52) U.S. Cl.
CPC ................. H04W 4/70 (2018.02); G06T 3/00 (2013.01)

(58) Field of Classification Search
CPC ... H04W 4/70; G06T 3/00; G06T 3/40; G06T 3/60; G06T 2210/22; H04L 67/303; H04L 67/12; G06N 20/00
See application file for complete search history.

(56) References Cited

U.S. PATENT DOCUMENTS

2006/0184532 A1* 8/2006 Hamada ............. H04N 1/32512
2013/0117798 A1* 5/2013 Ha ..................... H04N 21/4622
725/132

(Continued)

FOREIGN PATENT DOCUMENTS

JP 2004-235739 A 8/2004
KR 10-1908126 B1 12/2018

(Continued)

*Primary Examiner* — Michael A Keller
*Assistant Examiner* — Thao D Duong
(74) *Attorney, Agent, or Firm* — Fox Rothschild LLP

(57) ABSTRACT

The present disclosure relates to augmenting data in a machine-to-machine (M2M) system, and a method for operating an apparatus may include receiving a request message including information necessary for data augmentation, obtaining original data based on the information, generating augmented data from the original data based on the information, and storing the augmented data.

14 Claims, 9 Drawing Sheets

(56)  References Cited

U.S. PATENT DOCUMENTS

| 2017/0363744 | A1* | 12/2017 | Miya ....................... G01S 19/20 |
|---|---|---|---|
| 2018/0373999 | A1 | 12/2018 | Xu |
| 2019/0311254 | A1* | 10/2019 | Turek .................... G06N 3/063 |
| 2020/0053026 | A1* | 2/2020 | Rangachari ............. H04L 45/44 |
| 2021/0406543 | A1* | 12/2021 | Drummond ........... G06T 19/006 |
| 2022/0225079 | A1* | 7/2022 | Balakrishnan ........ H04W 8/186 |
| 2023/0028237 | A1* | 1/2023 | Wei ...................... G06V 10/764 |
| 2023/0412558 | A1* | 12/2023 | Lohmar ............. H04L 61/2591 |

FOREIGN PATENT DOCUMENTS

| KR | 10-2019-0143192 | A | 12/2019 |
|---|---|---|---|
| KR | 10-2020-0087310 | A | 7/2020 |
| KR | 102215899 | B1 | 2/2021 |
| KR | 10-2238401 | B1 | 4/2021 |

* cited by examiner

START

S701

RECEIVE REQUEST MESSAGE FOR DATA AUGMENTATION

S703

OBTAIN ORIGINAL DATA BASED ON REQUEST MESSAGE

S705

PERFROM DATA AUGMENTATION BASED ON
DATA AUGMENTATION INFORMATION

S707

STORE AUGMENTED DATA

END

810 dataAugmentation augmentType ~811 sourceResource ~812 augmentParameter ~813 targetResource ~814

METHOD AND DEVICE FOR AUGMENTING DATA IN M2M SYSTEM

CROSS-REFERENCE TO RELATED APPLICATIONS

The present application is a U.S. National Phase application under 35 U.S.C. § 371 of International Application No. PCT/KR2022/005291 filed on Apr. 12, 2022, which claims under 35 U.S.C. § 119 (e) the benefit of U.S. Provisional Application Ser. No. 63/186,390 filed on May 10, 2021, the entire contents of which are incorporated by reference herein.

BACKGROUND

(a) Technical Field

The present disclosure relates to a machine-to-machine (M2M) system, more particularly, to a method and apparatus for augmenting data in an M2M system.

(b) Description of the Related Art

Recently, Machine-to-Machine (M2M) systems have been introduced. An M2M communication may refer to a communication performed between machines without human intervention. M2M includes Machine Type Communication (MTC), Internet of Things (IoT) or Device-to-Device (D2D) communications. In the following description, the term "M2M" is uniformly used for convenience of explanation, but the present disclosure is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY

The present disclosure is directed to a method and apparatus for effectively augmenting data in a machine-to-machine (M2M) system.

The present disclosure is directed to a method and apparatus for managing information necessary for augmenting data in an M2M system.

The present disclosure is directed to a method and apparatus for expanding learning data to train an artificial intelligence (AI) model by augmenting data in an M2M system.

According to one embodiment of the present disclosure, a method for operating an apparatus in a machine-to-machine (M2M) system may include receiving a request message including information necessary for data augmentation, obtaining original data based on the information, generating augmented data from the original data based on the information, and storing the augmented data.

According to one embodiment of the present disclosure, an apparatus in a machine-to-machine (M2M) system may include a transceiver and a processor coupled with the transceiver, and the processor may be configured to receive a request message including information necessary for data augmentation, obtain original data based on the information, generate augmented data from the original data based on the information, and store the augmented data.

According to the present disclosure, data may be effectively augmented in a machine-to-machine (M2M) system.

Effects obtained in the present disclosure are not limited to the above-mentioned effects, and other effects not mentioned above may be clearly understood by those skilled in the art from the following description.

DETAILED DESCRIPTION

Figure 1:
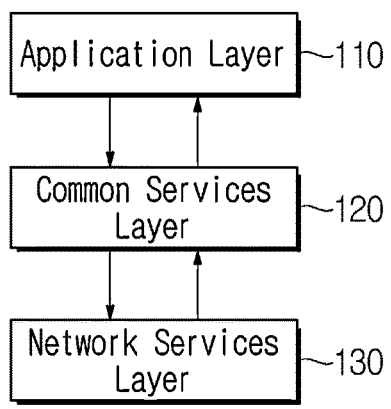
FIG. 1 illustrates a layered structure of a machine-to-machine (M2M) system according to the present disclosure.

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. In other words, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, exemplary embodiments that include other components in addition to the components described in the various exemplary embodiments are also included in the scope of the present disclosure.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

In addition, the present specification describes a network based on Machine-to-Machine (M2M) communication, and a work in M2M communication network may be performed in a process of network control and data transmission in a system managing the communication network. In the present specification, an M2M terminal may be a terminal performing M2M communication. However, in consideration of backward compatibility, it may be a terminal operating in a wireless communication system. In other words, an M2M terminal may refer to a terminal operating based on M2M communication network but is not limited thereto. An M2M terminal may operate based on another wireless communication network and is not limited to the exemplary embodiment described above.

In addition, an M2M terminal may be fixed or have mobility. An M2M server refers to a server for M2M communication and may be a fixed station or a mobile station. In the present specification, an entity may refer to hardware like M2M device, M2M gateway and M2M server. In addition, for example, an entity may be used to refer to software configuration in a layered structure of M2M system and is not limited to the embodiment described above.

In addition, for example, the present disclosure mainly describes an M2M system but is not solely applied thereto. In addition, an M2M server may be a server that performs communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and are not limited to the embodiment described above.

The present disclosure relates to a method and apparatus for enabling an artificial intelligence (AI) service in a machine-to-machine (M2M) system. More particularly, the present disclosure describes a technology of managing information associated with training of an artificial intelligence model in an M2M system.

oneM2M is a de facto standards organization that was founded to develop a communal IoT service platform sharing and integrating application service infrastructure (platform) environments beyond fragmented service platform development structures limited to separate industries like energy, transportation, national defense and public service.oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security and health. In this regard, oneM2M has developed a set of standards defining a single horizontal platform for data exchange and sharing among all the applications. Applications across different industrial sections may also be considered by oneM2M. Like an operating system, oneM2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of a Machine-to-Machine (M2M) system according to the present disclosure. Referring to FIG. 1, a layered structure of an M2M system may include an application layer 110, a common services layer 120 and a network services layer 130. Herein, the application layer 110 may be a layer operating based on a specific application. For example, an application may be a fleet tracking application, a remote blood sugar monitoring application, a power metering application or a controlling application. In other words, an application layer may be a layer for a specific application. Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may provide a set of services that are grouped into CSFs according to functions.

A multiplicity of instantiated CSFs constitutes CSEs. CSEs may interface with applications (for example, application entities or AEs in the terminology of oneM2M), other CSEs and base networks (for example, network service entities or NSEs in the terminology of oneM2M). The network services layer 130 may provide the common services layer 120 with services such as device management, location service and device triggering. Herein, an entity operating based on the network layer 120 may be a network service entity (NSE).

Figure 2:
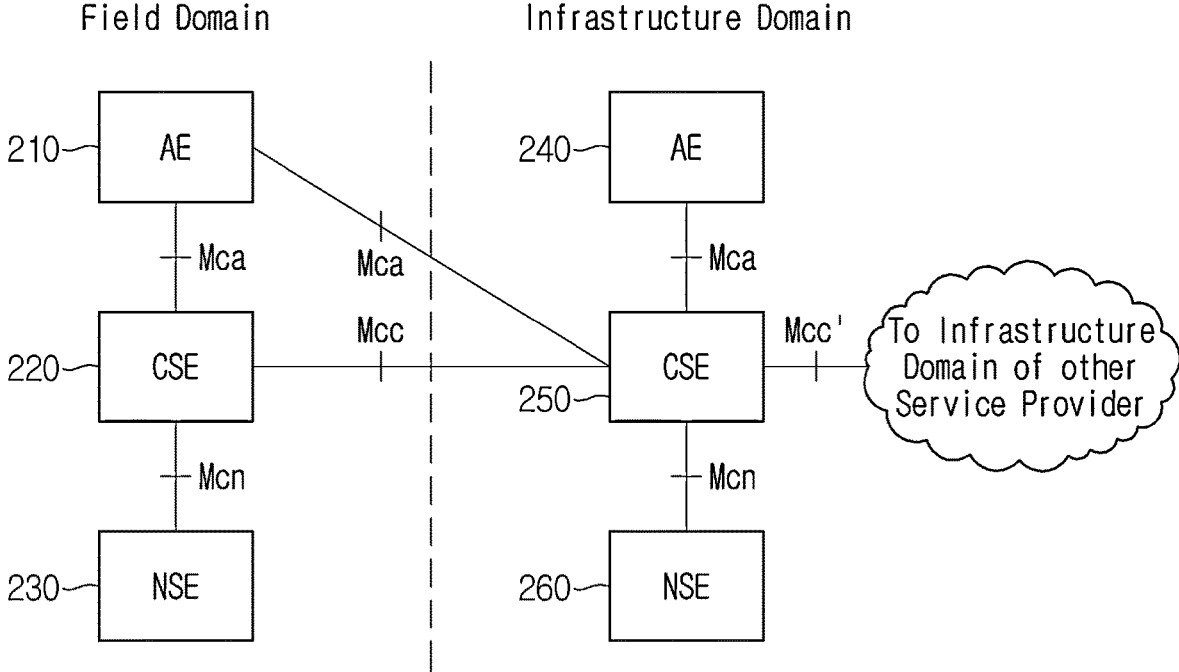
FIG. 2 illustrates a reference point in an M2M system according to the present disclosure.

FIG. 2 is a view illustrating reference points in an M2M system according to the present disclosure. Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
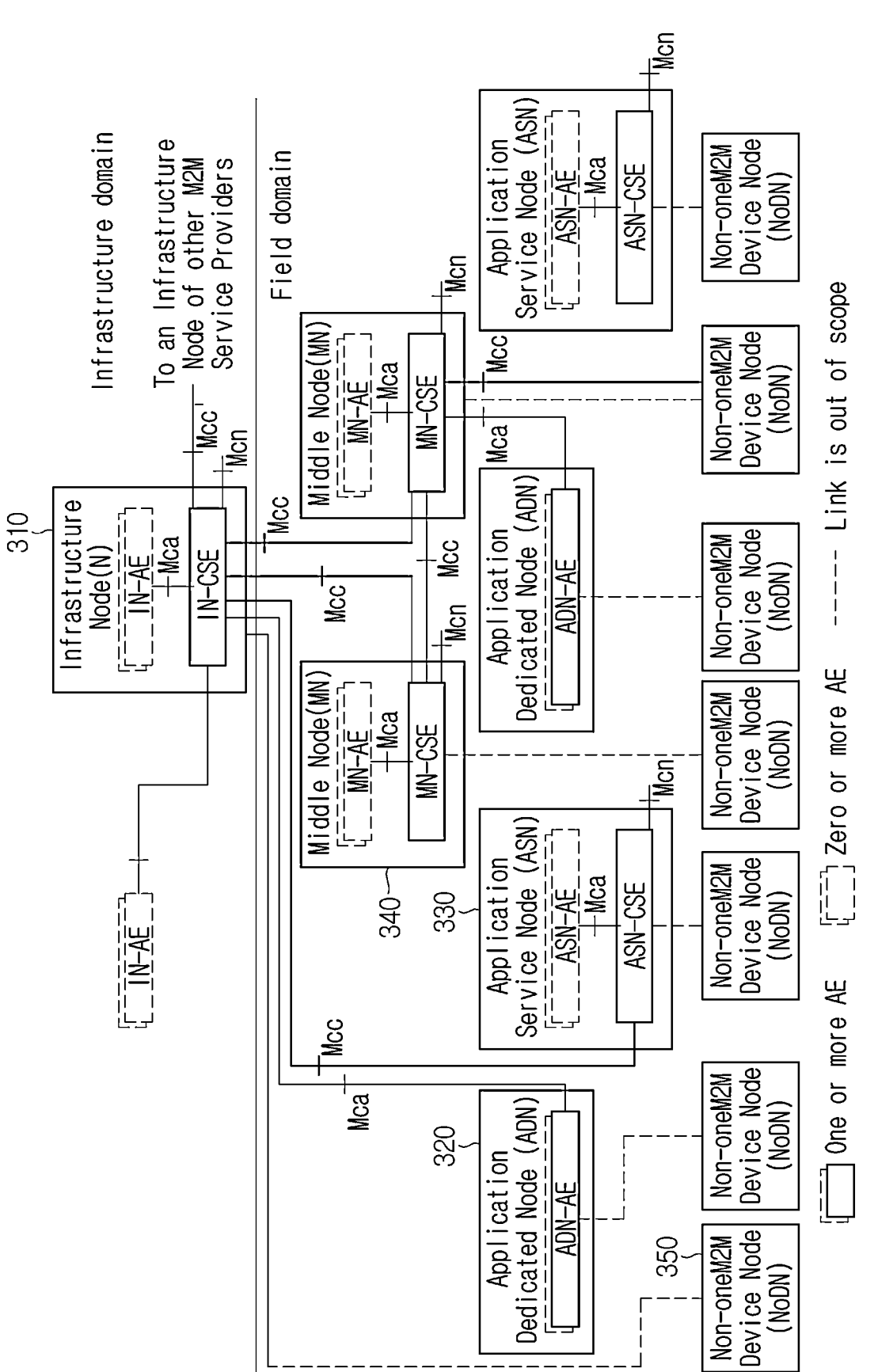
FIG. 3 illustrates each node in an M2M system according to the present disclosure.

FIG. 3 is a view illustrating each node in an M2M system according to the present disclosure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not CSE. In particular, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that is set in an M2M terminal in hardware.

In addition, a middle node (MN) 340 may be a node including a CSE and including zero or more AEs. In particular, the MN may be set in the field domain. An MN may be connected to another MN or IN based on a reference point. In addition, for example, an MN may be set in an M2M gateway in hardware. As an example, a non-M2M terminal node 350 (Non-M2M device node, NoDN) is a node that does not include M2M entities. It may be a node that performs management or collaboration together with an M2M system.

Figure 4:
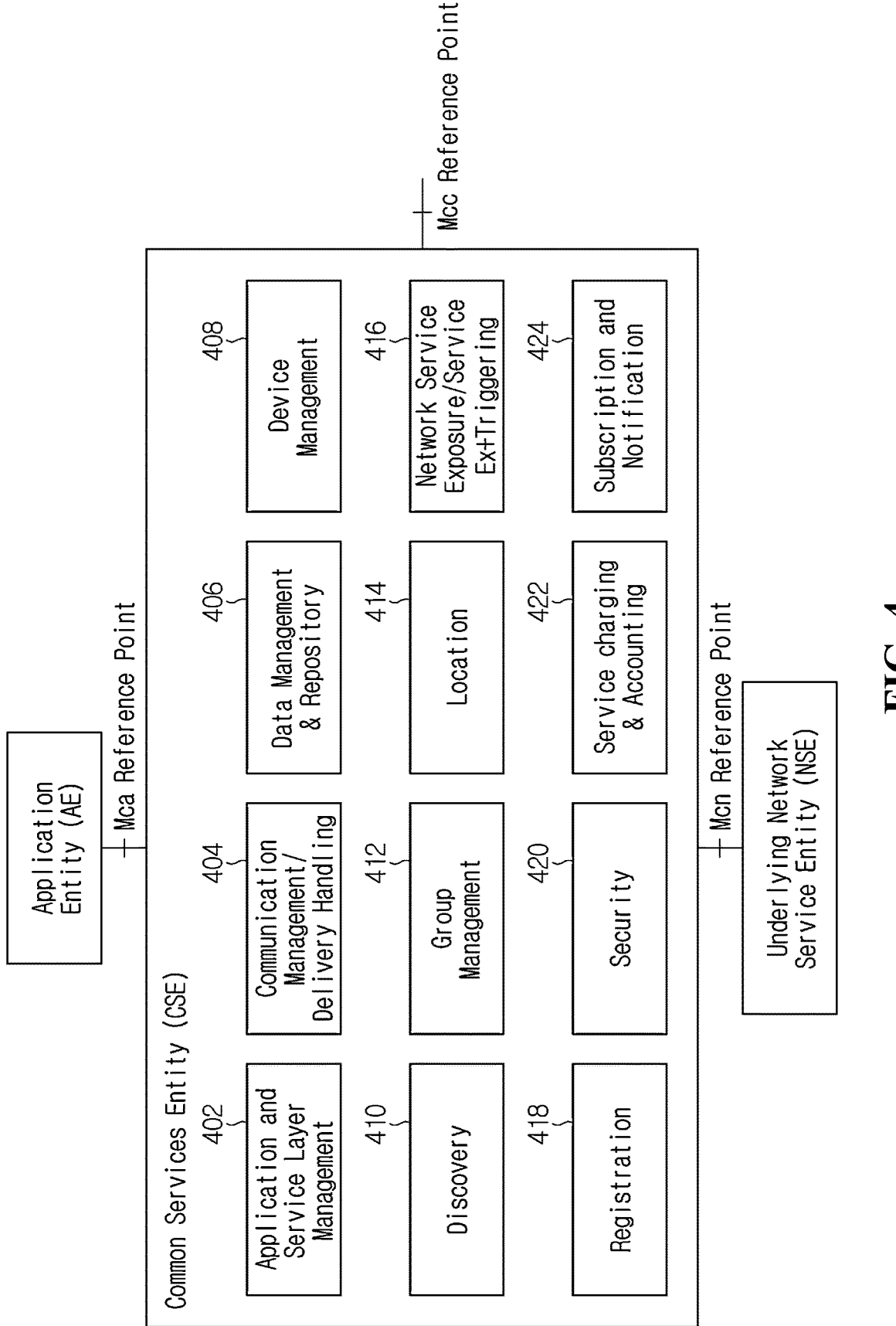
FIG. 4 illustrates a common service function in an M2M system according to the present disclosure.

FIG. 4 is a view illustrating a common service function in an M2M system according to the present disclosure. Referring to FIG. 4, common service functions may be provided. For example, a common service entity may provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and is not limited to the above-described exemplary embodiment.

The application and service layer management 402 CSF provides management of AEs and CSEs. The application and service layer management 402 CSF includes not only the configuring, problem solving and upgrading of CSE functions but also the capability of upgrading AEs. The communication management and delivery handling 404 CSF provides communications with other CSEs, AEs and NSEs. The communication management and delivery handling 404 CSF are configured to determine at what time and through what connection communications are to be delivered, and also determine to buffer communication requests to deliver the communications later, if necessary and permitted.

The data management and repository 406 CSF provides data storage and transmission functions (for example, data collection for aggregation, data reformatting, and data storage for analysis and sematic processing). The device management 408 CSF provides the management of device capabilities in M2M gateways and M2M devices.

The discovery 410 CSF is configured to provide an information retrieval function for applications and services based on filter criteria. The group management 412 CSF provides processing of group-related requests. The group management 412 CSF enables an M2M system to support bulk operations for many devices and applications. The location 414 CSF is configured to enable AEs to obtain geographical location information.

The network service exposure/service execution and triggering 416 CSF manages communications with base networks for access to network service functions. The registration 418 CSF is configured to provide AEs (or other remote CSEs) to a CSE. The registration 418 CSF allows AEs (or remote CSE) to use services of CSE. The security 420 CSF is configured to provide a service layer with security functions like access control including identification, authentication and permission. The service charging and accounting 422 CSF is configured to provide charging functions for a service layer. The subscription/notification 424 CSF is configured to allow subscription to an event and notifying the occurrence of the event.

Figure 5:
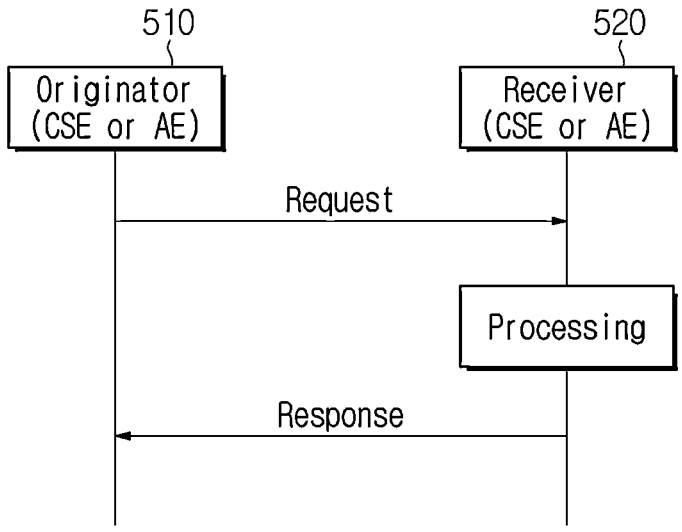
FIG. 5 illustrates a method in which an originator and a receiver exchange a message in an M2M system according to the present disclosure.

FIG. 5 is a view illustrating that an originator and a receiver exchange a message in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 are not limited to M2M terminals but may be other terminals. They are not limited to the above-described exemplary embodiment. In addition, for example, the originator 510 and the receiver 520 may be nodes, entities, servers or gateways, which are described above. In other words, the originator 510 and the receiver 520 may be hardware or software configurations and are not limited to the above-described embodiment.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. An identification parameter may be a parameter required for identification of each other.

Further, an operation parameter may be a parameter for distinguishing operations. For example, an operation parameter may be set to any one among Create, Retrieve, Update, Delete and Notify. In other words, the parameter may aim to distinguish operations. In response to receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, in response to determining that a parameter is valid and authorized, the receiver 520 may be configured to check whether there is a requested resource and perform processing accordingly.

For example, in case an event occurs, the originator 510 may be configured to transmit a request message including a parameter for notification to the receiver 520. The receiver 520 may be configured to check a parameter for a notification included in a request message and may perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

| Response message parameter/success or not |
| --- |
| Response Status Code - successful, unsuccessful, ack |
| Request Identifier - uniquely identifies a Request message |
| Content - to be transferred |
| To - the identifier of the Originator or the Transit CSE that sent the corresponding non-blocking request |
| From - the identifier of the Receiver |
| Originating Timestamp - when the message was built |
| Result Expiration Timestamp - when the message expires |
| Event Category - what event category shall be used for the response message |
| Content Status |
| Content Offset |
| Token Request Information |
| Assigned Token Identifiers |
| Authorization Signature Request Information |
| Release Version Indicator - the oneM2M release version that this response message conforms to |

A filter criteria condition, which can be used in a request message or a response message, may be defined as in Table 2 and Table 3 below.

TABLE 2

| Condition tag | Multiplicity | Description / Matching Conditions |
| --- | --- | --- |
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value1, label-value2}. Details are defined in [3] |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentSize attribute of the <contentInstance> matched resource is equal to or greater than the specified value. |
| sizeBelow | 0 . . . 1 | The contentSize attribute of the <contentInstance> matched resource is smaller than the specified value. |

TABLE 2-continued

| Condition tag | Multiplicity | Description |
|---|---|---|
| | | Matching Conditions |
| contentType | 0 . . . n | The contentInfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g. creator of container resource type can be used as a filter criteria tag as "creator = Sam", "creator = Sam*", "creator = *Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery.<br>In the case of semantic resource discovery targeting a specific resource, if the semantic description contained in the <semanticDescriptor> of a child resource matches the semanticFilter, the URI of this child resource will be included in the semantic resource discovery result.<br>In the case of semantic query, given a received semantic query request and its query scope, the SPARQL query statement shall be executed over aggregated semantic information collected from the semantic resource(s) in the query scope and the produced output will be the result of this semantic query.<br>Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multiplicity | Description |
|---|---|---|
| | | Filter Handling Conditions |
| filterUsage | 0 . . . 1 | Indicates how the filter criteria is used. If provided, possible values are 'discovery' and 'IPEOnDemandDiscovery'.<br>If this parameter is not provided, the Retrieve operation is a generic retrieve operation and the content of the child resources fitting the filter criteria is returned.<br>If filterUsage is 'discovery', the Retrieve operation is for resource discovery (clause 10.2.6), i.e. only the addresses of the child resources are returned.<br>If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g. . ./tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either manda- tory or optional according to a requested operation or a mandatory response code. For example, a request message may include at least one parameter among those listed in Table 4 below.

TABLE 4

| Request message parameter | |
| --- | --- |
| Mandatory | Operation - operation to be executed/CREAT, Retrieve, Update, Delete, Notify |
| | To - the address of the target resource on the target CSE |
| | From - the identifier of the message Originator |
| | Request Identifier - uniquely identifies a Request message |
| Operation | Content - to be transferred |
| dependent | Resource Type - of resource to be created |
| Optional | Originating Timestamp - when the message was built |
| | Request Expiration Timestamp - when the request message expires |
| | Result Expiration Timestamp - when the result message expires |
| | Operational Execution Time - the time when the specified operation is to be executed by the target CSE |
| | Response Type - type of response that shall be sent to the Originator |
| | Result Persistence - the duration for which the reference containing the responses is to persist |
| | Result Content - the expected components of the result |
| | Event Category - indicates how and when the system should deliver the message |
| | Delivery Aggregation - aggregation of requests to the same target CSE is to be used |
| | Group Request Identifier - Identifier added to the group request that is to be fanned out to each member of the group |
| | Group Request Target Members-indicates subset of members of a group |
| | Filter Criteria - conditions for filtered retrieve operation |
| | Desired Identifier Result Type - format of resource identifiers returned |
| | Token Request Indicator - indicating that the Originator may attempt Token Request procedure (for Dynamic Authorization) if initiated by the Receiver |
| | Tokens - for use in dynamic authorization |
| | Token IDs - for use in dynamic authorization |
| | Role IDs - for use in role based access control |
| | Local Token IDs - for use in dynamic authorization |
| | Authorization Signature Indicator - for use in Authorization Relationship Mapping |
| | Authorization Signature - for use in Authorization Relationship Mapping |
| | Authorization Relationship Indicator - for use in Authorization Relationship Mapping |
| | Semantic Query Indicator - for use in semantic queries |
| | Release Version Indicator - the oneM2M release version that this request message conforms to. |
| | Vendor Information |

A normal resource includes a complete set of representations of data constituting the base of information to be managed. Unless qualified as either "virtual" or "announced", the resource types in the present document are normal resources. A virtual resource is used to trigger processing and/or a retrieve result. However, a virtual resource does not have a permanent representation in a CSE. An announced resource contains a set of attributes of an original resource. When an original resource changes, an announced resource is automatically updated by the hosting CSE of the original resource. The announced resource contains a link to the original resource. Resource announcement enables resource discovery. An announced resource at a remote CSE may be used to create a child resource at a remote CSE, which is not present as a child of an original resource or is not an announced child thereof.

To support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

Entering its maturity stage, the IoT market is expanding the area of application like other information technology (IT) fields. Accordingly, the amount of data to be processed in an M2M system continues to increase. To effectively process such an increasing amount of data, an M2M system may apply an artificial intelligence technology (for example, machine learning (ML) technology). As an example, an IoT device may analyze data about temperature, pressure, humidity, air quality, vibration, sound, and the like, which are obtained through smart sensors, using machine learning, that is, an artificial intelligence technology, to automatically identify a pattern of the data and detect an abnormality of the device. Recently, as software products provided to an IoT platform are equipped with a machine learning-based AI technology, an improved IoT service is provided.

Many AI applications use data collected in IoT platforms. As a place holder for IoT data, image data stored in an M2M system may be subject for training data by an AI application. For example, an AI application may train its model based on images stored in various resources in an M2M platform. To enhance the performance of an AI application, a large amount of data used for training an AI model is needed. Accordingly, when there is a small dataset of images, the AI application should enhance the existing dataset. Thus, the AI application may build a better model.

Typically, an AI application may take a small dataset. Herein, the AI application may transform objects by zooming in or zooming out to different sizes, flipping the objects vertically or horizontally, or making a significant change in brightness for the objects. When an M2M platform supports data augmentation features, an AI application may easily concentrate on building a model based on an augmented dataset.

Data augmentation is a technique available to artificially expand a size of a dataset by generating modified data from existing data. An M2M system may support a technique of expanding a size of a dataset necessary for training of an AI model through data augmentation. In case an initial dataset is too small to perform training or better performance is desired from a model, data augmentation may be useful.

Data augmentation may be used to augment audio data, text data, image data, and the like. Hereinafter, the present disclosure describes augmentation of image data, for example, in detail. However, various embodiments of the present disclosure may be used to augment various types of data such as images and the like and are not limited to the embodiment of augmenting image data described below.

Various information may be required to perform data augmentation in an M2M system according to various embodiments. For example, at least one of a source resource uniform resource identifier (URI) storing a target image, types of data augmentation, parameters for selected data augmentation, and a destination resource URI for storing an augmented image may be required. Herein, the types of augmentation may be designated as one of various supported augmented techniques. For image resources, an M2M platform according to various embodiments may support at least one of augmentation techniques listed in Table 5 below.

TABLE 5

| Augmentation techniques | Description |
|---|---|
| Flipping | Flips the image vertically or horizontally |
| Rotation | Rotates the image by a specified degree |
| Shearing | Shifts one part of the image like a parallelogram |
| Cropping | Makes an object appear in different positions in different proportions in the image |
| Scaling | Zoom in/zoom out |
| Color adjustment | Changes brightness or contrast |

Each of the augmentation techniques listed in Table 5 requires different configuration parameters.

Figure 6:
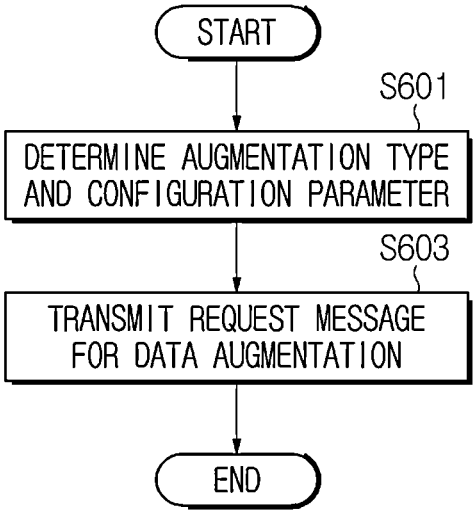
FIG. 6 illustrates an example of a procedure of requesting augmentation of data in an M2M system according to the present disclosure.

FIG. 6 illustrates an example of a procedure of requesting augmentation of data in an M2M system according to the present disclosure. The operation subject of FIG. 6 may be a device operating as an AE that desires to obtain augmented data. Hereinafter, the operation subject of FIG. 6 will be referred to as 'device'.

Referring to FIG. 6, at step S601, the device determines an augmentation type and at least one configuration parameter. The device desires to obtain augmented data for given original data, and for this end, may determine which type of augmentation is to be applied. When an augmentation type is determined, a configuration parameter required according to the augmentation type may be determined. Accordingly, the device may identify at least one required configuration parameter and determine a value of the at least one required configuration parameter thus identified.

At step S603, the device transmits a request for data augmentation. The request message may be sent to a CSE managing a resource associated with data augmentation and include information necessary for data augmentation (here- inafter, 'data augmentation information'). That is, the resource associated with data augmentation may be already generated, and the request message including data augmen- tation information necessary for setting values of attributes included in the resource may be sent. For example, the data augmentation information may include at least one of infor- mation indicating an augmentation type, information on at least one configuration parameter required for an augment- ing operation, information on original data, and information on a resource that will store augmented data. Herein, each information item included in the data augmentation infor- mation may correspond to each attribute included in a resource associated with data augmentation.

Figures 7, 8:
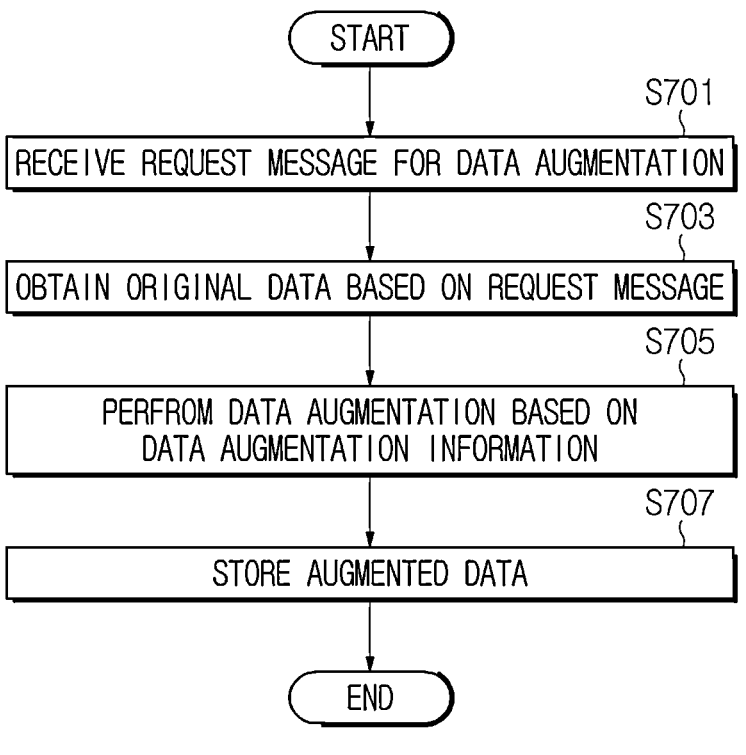
FIG. 7 illustrates an example of a procedure of augmenting data in an M2M system according to the present disclosure.
FIG. 8 illustrates an example of a structure of a resource associated with data augmentation in an M2M system according to the present disclosure.

FIG. 7 illustrates an example of a procedure of augment- ing data in an M2M system according to the present disclo- sure. The operation subject of FIG. 7 may be a device operating as an IN-CSE that manages a resource associated with data augmentation. Hereinafter, the operation subject of FIG. 7 will be referred to as 'device'.

Referring to FIG. 7, at step S701, the device receives a request message for data augmentation. The request mes- sage may be received from an AE that desires to obtain augmented data and may include data augmentation infor- mation. That is, a resource associated with data augmenta- tion may be already generated, and the device may configure values of attributes included in the resource by using the data augmentation information. For example, the data augmen- tation information may include at least one of information indicating an augmentation type, information on at least one configuration parameter required for an augmenting opera- tion, information on original data, and information on a resource that will store augmented data. Herein, each infor- mation item included in the data augmentation information may correspond to each attribute included in a resource associated with data augmentation. Herein, a format of the information on the at least one configuration parameter required for an augmenting operation may be different according to an augmentation type indicated by the infor- mation indicating an augmentation type.

At step S703, the device obtains original data based on the request message. For example, the device may obtain the original data based on information stored in the resource associated with data augmentation. That is, the device may identify a source resource storing the original data in the resource associated with data augmentation and retrieve the original data from the source resource. The original data may be referred to as first data, existing data, or any other term having a technical meaning equivalent thereto and may not be limited to a specific name.

At step S705, the device performs data augmentation based on the data augmentation information. In other words, the device generates augmented data from the original data based on the data augmentation information. For example, the device may generate the augmented data using an augmentation technique indicated by the data augmentation information among flipping, rotation, shearing, cropping, scaling, and color adjustment. Herein, the device applies a configuration parameter indicated by the data augmentation information. The augmented data may be referred to as second data or any other term having a technical meaning equivalent thereto and may not be limited to a specific name.

At step S707, the device stores the augmented data. The device may store the augmented data in a target resource indicated by the data augmentation information. Accord- ingly, an AE requesting data augmentation may retrieve the augmented data from the target resource. Herein, the target resource may have the same or different original data as the stored source resource. Herein, the device may store infor- mation indicating that the augmented data is stored in the target resource together.

According to the above-described embodiments, data augmentation may be performed using a resource associated with data augmentation. A resource associated with data augmentation may be referred to as <dataAugmentation>. For example, the <dataAugmentation> resource may have a structure as shown in FIG. 8. FIG. 8 illustrates an example of a structure of a resource associated with data augmenta- tion in an M2M system according to the present disclosure. Referring to FIG. 8, the <dataAugmentation> resource 810 may include augmentType 811, source Resource 812, aug- mentParameter 813, and targetResource 814. Each of the attributes has a meaning presented in Table 6 below.

TABLE 6

| Attribute | Description |
|---|---|
| augmentType | Type of data augmentation (resize, crop, shear, and the like) |
| sourceResource | A resource that contains a raw image |
| augmentParameter | Parameters required for a selected augmentation type |
| targetResource | Parameters or a parameter set for storing a generated image |

Table 6 exemplifies four attributes, but a resource for data augmentation may further include another attribute or parameter necessary to perform data augmentation according to necessity. In an M2M platform, an IoT device may expand a size of a dataset by augmenting data according to various augmentation types. Hereinafter, the present disclosure describes various embodiments according to data augmentation types.

The rotation of an image may be described as follows.

According to one embodiment, rotation of an image may be performed by specifying a rotation angle. A device may generate augmented data by rotating an original image at a specific angle between −356 degrees and +356 degrees. Herein, the rotation angle may be designated by a user or determined according to a predefined configuration. To this end, as a configuration parameter, a rotation angle value may be input.

According to one embodiment, a random rotation angle may be used. In this case, a plurality of candidate angles may be defined, and one of the candidate angles may be randomly selected. For example, when 30 and 90 degrees are input configuration parameters, a random angle of the two angles may be selected to rotate an image. To this end, candidate angle values may be input as configuration parameters.

According to one embodiment, an image may be rotated at a rotation angle randomly determined within any range. To this end, a lower limit value and an upper limit value of a range for randomly determining a rotation angle may be input as configuration parameters. A device may randomly determine a rotation angle within a range satisfying the lower limit value and the upper limit value and rotate an image at as much as the determined rotation angle. Herein, the device may generate as many augmented images as a specified number. For example, when a lower limit value of A degree, an upper limit value of B degree, and the number 100 are input as configuration parameters, the device generates 100 rotated images with random rotation angles within a range from A degree to B degree. To this end, at least one of the upper limit value, the lower limit value, and the number of images may be input as a configuration parameter.

Shearing of an image may be described as follows. Shearing may be used to shift one part of an image to a direction and the other part to the opposite direction. Shearing may have similar options to rotation.

According to one embodiment, a device may generate augmented data by shearing an original image at a specified angle. For example, when a specified shearing angle is +45 degrees, the device may generate an image sheared from an original image at 45 degrees. To this end, as a configuration parameter, an angle value may be input.

According to one embodiment, a random shearing angle may be used. In this case, a plurality of candidate angles may be defined, and one of the candidate angles may be randomly selected. For example, when 30 and 90 degrees are input configuration parameters, a random angle of the two angles may be selected to shear an image. To this end, candidate angle values may be input as configuration parameters.

According to one embodiment, an image may be sheared at an angle randomly determined within any range. A lower limit value and an upper limit value of a range for determining a shearing angle may be input as configuration parameters. A device may randomly determine a shearing angle within a range satisfying the received lower limit value and upper limit value and generate data with an image sheared at the determined shearing angle. Additionally, the number of generated images may be further input. In this case, as many augmented images as a specified number may be generated through shearing within a specified range of lower limit value and upper limit value. To this end, at least one of the upper limit value, the lower limit value, and the number of images may be input as a configuration parameter.

Flipping of an image may be described as follows.

According to one embodiment, a device may generate augmented data by flipping an original image horizontally or vertically. To this end, a direction value of flipping may be input as a configuration parameter.

Color adjustment of an image may be described as follows.

According to one embodiment, the brightness of an image may be changed using different contrasts. According to a selected contrast, various input parameters may be selected. Parameters for a contrast-type augmentation type may include a contrast filter parameter and a contrast value parameter. The contrast filter parameter may indicate one of various contrast types including gamma contrast, sigmoid contrast, and linear contrast. The contrast value parameter may indicate an application value of a selected contrast filter. The contrast value may be different according to the selected contrast filter. To this end, at least one of a contrast filter value and a contrast level value may be input as a configuration parameter.

According to one embodiment, the brightness of an image may be adjusted by uniformly increasing or decreasing color values of pixel values. However, since information may be lost by an excessive degree of adjustment, brightness needs to be adjusted within an appropriate range. To this end, at least one of a bright change value, candidate values, an upper limit value, a lower limit value, the number of images may be input as a configuration parameter.

Scaling of an image may be described as follows. Scaling enables an original image to be zoomed in or zoomed out by a scale. A scaling ratio may be designated by a user or determined according to a predefined configuration.

According to one embodiment, a device may change a size of an original image with a designated scaling ratio. For example, when the designated scaling ratio is 150%, the device may generate data that expands the original image by 150%. To this end, a ratio value may be input as a configuration parameter. Alternatively, a ratio value and a value indicating zoom-in/zoom-out may be input as a configuration parameter.

According to one embodiment, a device may scale an original image with a scaling ratio randomly determined within any range. A lower limit value and an upper limit value of a range for determining a scaling ratio may be input as configuration parameters. The device may randomly determine a scaling ratio within a range satisfying a designated lower limit value and a designated upper limit value and scale the original image with the determined scaling ratio. Herein, the number of augmented datasets may further be designated. In this case, the device may generate as many scaled images as the designated number within a given scaling ratio. To this end, at least one of the upper limit value, the lower limit value, and a value of the number may be input as a configuration parameter.

As described above, there are various augmentation types, and different configuration parameters may be required according to an augmentation type. Furthermore, even when a same augmentation type is used, different configuration parameters may be required according to a detailed augmentation policy (for example, a case of rotation, designated scaling, candidate random scaling, scope random scaling, and the like). Accordingly, according to one embodiment, a device (for example, CSE) performing augmentation may determine which augmentation policy is requested, through at least one signaled configuration parameter. According to another embodiment, in order to deliver an augmentation policy more clearly, an indicator for the augmentation policy may further be delivered together with at least one configuration parameter. For example, the indicator may be included in an attribute including the configuration parameter or be defined as a separate attribute.

Figure 9:
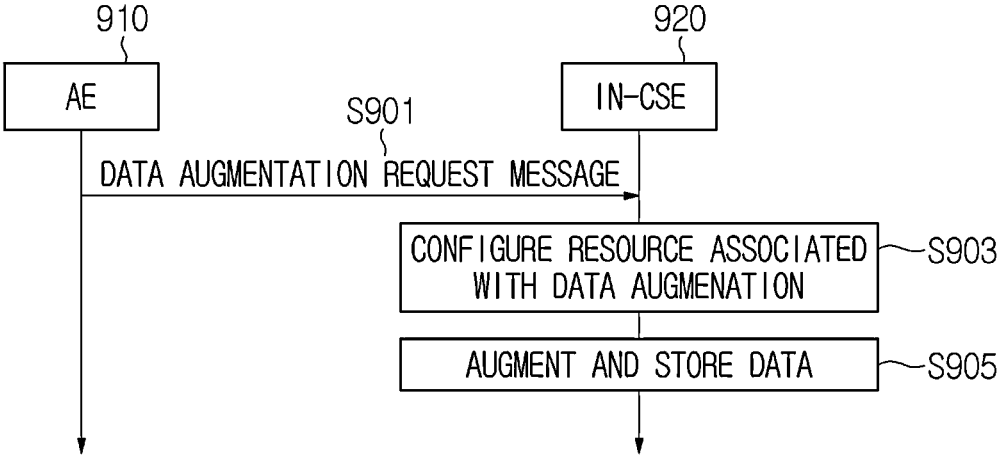
FIG. 9 illustrates an example of a procedure for data augmentation in an M2M system according to the present disclosure.

FIG. 9 illustrates an example of a procedure for data augmentation in an M2M system according to the present disclosure. FIG. 9 exemplifies signal exchange between an AE 910 and an IN-CSE 920.

Referring to FIG. 9, at step S910, the AE 910 transmits a request message for data augmentation to the IN-CSE 920. As an example, the AE 910 may transmit a request for a resource for data augmentation (for example, <dataAugmentation> resource) to the IN-CSE 920. A data augmentation request message may include a value corresponding to at least one of attributes included in the <dataAugmentation> resource. For example, the <dataAugmentation> resource may include at least one of an augmentation type attribute, an augmentation type parameter attribute, a source resource attribute, and a target resource attribute.

At step S903, the IN-CSE 920 configures a resource associated with data augmentation. Specifically, the IN-CSE 920 generates a resource associated with data augmentation and configure values of attributes included in the resource associated with data augmentation. Herein, the resource associated with data augmentation may be generated in advance. At step S901, the IN-CSE 920 may configure values of attributes based on data augmentation information in the received request message.

At step S905, the IN-CSE 920 augments data and stores augmented data. The CSE 920 may obtain original data, which is a target of data augmentation, from a source resource by using a source resource attribute. The CSE 920 may apply an augmentation type and a configuration parameter, which are identified based on the augmentation type attribute and the augmentation type parameter attribute, to the original data. The CSE 920 may store the generated augmented data in a target resource identified based on a target resource attribute.

Figure 10:
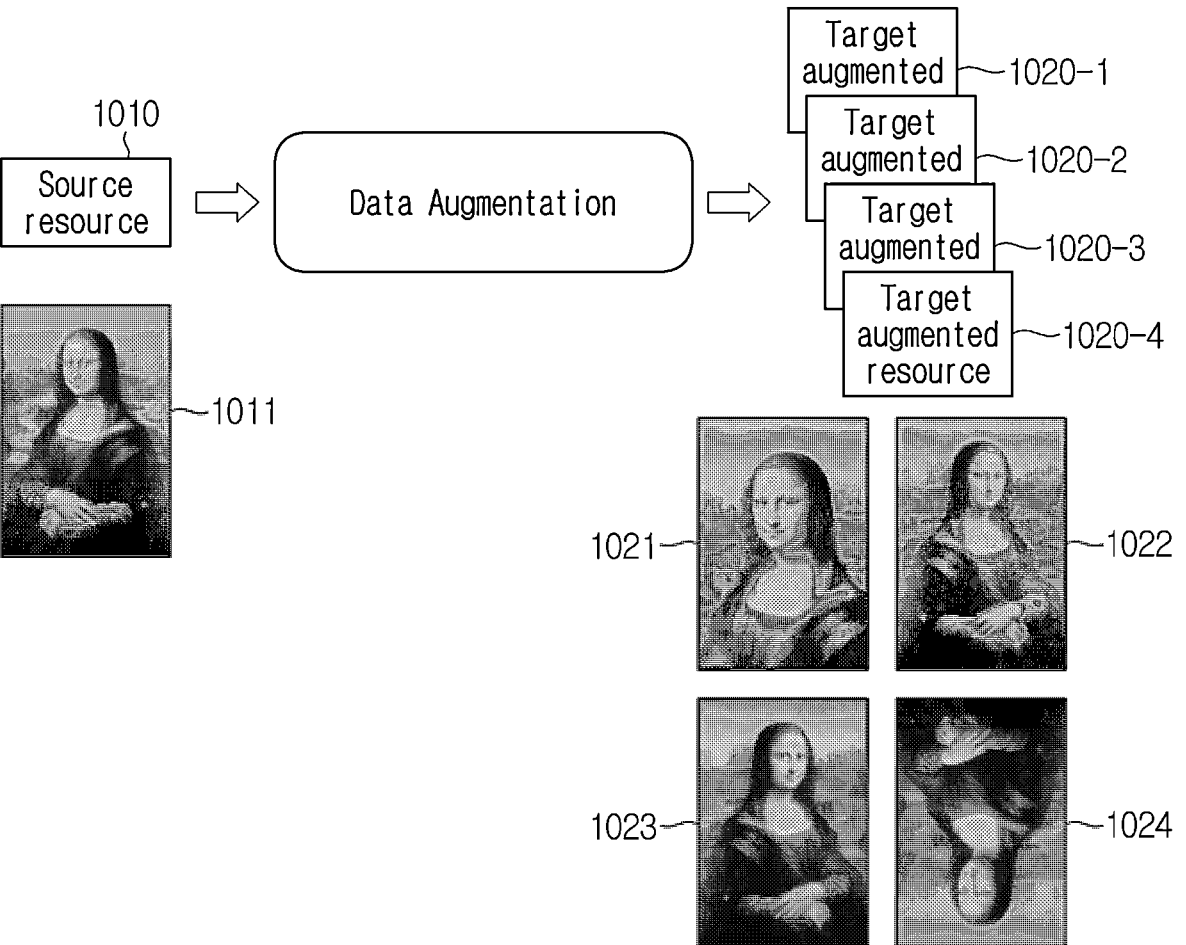
FIG. 10 illustrates an example of an augmented dataset in an M2M system according to the present disclosure.

FIG. 10 illustrates an example of an augmented dataset in an M2M system according to the present disclosure. Referring to FIG. 10, an original image 1011 is stored in a source resource 1010. Through data augmentation, augmented images 1021, 1022, 1023 and 1024 are generated from the original image 1011. As in FIG. 10, the augmented image 1021 is generated by scaling, the augmented image 1022 is generated by horizontal flipping and black-and-white conversion, the augmented image 1023 is generated by horizontal flipping, and the augmented image 1024 is generated by vertical flipping. The augmented images 1021, 1022, 1023 and 1024 may each be stored in a target augmented resource 1020.

Figure 11:
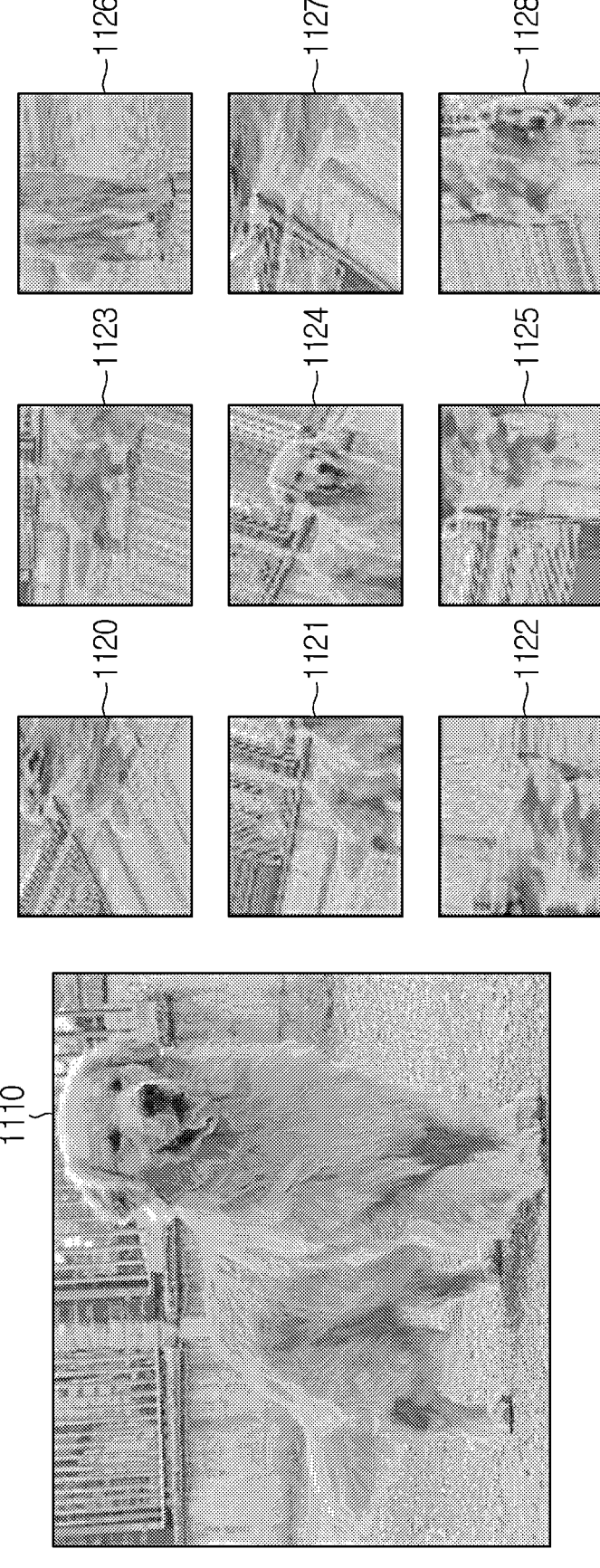
FIG. 11 illustrates another example of an augmented dataset in an M2M system according to the present disclosure.

FIG. 11 illustrates another example of an augmented dataset in an M2M system according to the present disclosure. Referring to FIG. 11, nine augmented images 1120, 1121, 1122, 1123, 1124, 1125, 1126, 1127 and 1128 may be generated from an original image 1110. One or two or more augmentation types may be applied for image augmentation. That is, augmentation types may overlap each other to be applied.

Figure 12:
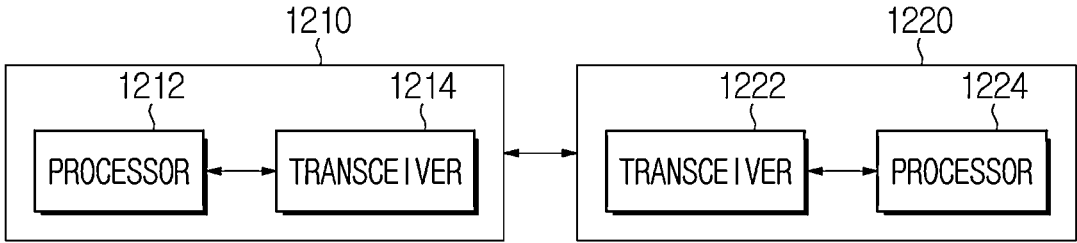
FIG. 12 illustrates a configuration of an M2M device in an M2M system according to the present disclosure.

FIG. 12 illustrates a configuration of an M2M device in an M2M system according to the present disclosure. An M2M device 1210 or an M2M device 1220 illustrated in FIG. 12 may be understood as hardware functioning as at least one among the above-described AE, CSE and NSE.

Referring to FIG. 12, the M2M device 1210 may include a processor 1212 controlling a device and a transceiver 1214 transmitting and receiving a signal. Herein, the processor 1212 may control the transceiver 1214. In addition, the M2M device 1210 may communicate with another M2M device 1220. The another M2M device 1220 may also include a processor 1222 and a transceiver 1224, and the processor 1222 and the transceiver 1224 may perform the same function as the processor 1212 and the transceiver 1214.

As an example, the originator, the receiver, AE and CSE, which are described above, may be one of the M2M devices 1210 and 1220 of FIG. 12, respectively. In addition, the devices 1210 and 1220 of FIG. 12 may be other devices. As an example, the devices 1210 and 1220 of FIG. 12 may be communication devices, vehicles, or base stations. That is, the devices 1210 and 1220 of FIG. 12 refer to devices capable of performing communication and are not limited to the above-described embodiment.

The above-described exemplary embodiments of the present disclosure may be implemented by various means. For example, the exemplary embodiments of the present disclosure may be implemented by hardware, firmware, software, or a combination thereof.

The foregoing description of the exemplary embodiments of the present disclosure has been presented for those skilled in the art to implement and perform the disclosure. While the foregoing description has been presented with reference to the preferred embodiments of the present disclosure, it will be apparent to those skilled in the art that various modifications and variations can be made in the present disclosure without departing from the spirit or scope of the present disclosure as defined by the following claims.

Accordingly, the present disclosure is not intended to be limited to the exemplary embodiments shown herein but is to be accorded the widest scope consistent with the principles and novel features disclosed herein. In addition, while the exemplary embodiments of the present specification have been particularly shown and described, it is to be understood that the present specification is not limited to the above-described exemplary embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the disclosure and the method disclosure are explained, and the description of both disclosures may be supplemented as necessary. In addition, the present disclosure has been described with reference to exemplary embodiments thereof. It will be understood by those skilled in the art that various changes in form and details may be made therein without departing from the essential characteristics of the present disclosure. Therefore, the disclosed exemplary embodiments should be considered in an illustrative sense rather than in a restrictive sense. The scope of the present disclosure is defined by the appended claims rather than by the foregoing description, and all differences within the scope of equivalents thereof should be construed as being included in the present disclosure.

What is claimed is:

1. A method for operating an apparatus in a machine-to-machine (M2M) system, the method comprising:
   receiving a request message including information necessary for data augmentation;
   obtaining original data based on the information;
   generating augmented data from the original data based on an augmentation type corresponding to the information, wherein the augmentation type is obtained from attributes of a resource associated with data augmentation;
   storing the augmented data in at least one of the attributes; and
   retrieving the augmented data from the at least one of the attributes storing the augmented data.

2. The method of claim 1 further comprising configuring the attributes of the resource associated with the data augmentation based on the information.

3. The method of claim 1, wherein the information includes information indicating the augmentation type, information on at least one configuration parameter required for an augmenting operation, information on the original data, and information on the resource that will store the augmented data.

4. The method of claim 3, wherein the information indicating the augmentation type is configured to indicate at least one of flipping, rotation, shearing, cropping, scaling, and color adjustment.

5. The method of claim 3, wherein a format of the information on the at least one configuration parameter required for the augmenting operation becomes different according to the augmentation type indicated by the information indicating the augmentation type.

6. The method of claim 3, wherein a format of the information on the at least one configuration parameter required for the augmenting operation becomes different according to the augmentation type indicated by the information indicating the augmentation type and an augmentation policy on the augmentation type.

7. The method of claim 6, wherein the request message further includes an indicator indicating the augmentation policy.

8. An apparatus in a machine-to-machine (M2M) system, the apparatus comprising:
   a transceiver; and
   a processor coupled with the transceiver,
   wherein the processor is configured to:
   receive a request message including information necessary for data augmentation;
   obtain original data based on the information;
   generate augmented data from the original data based on an augmentation type corresponding to the information, wherein the augmentation type is obtained from attributes of a resource associated with data augmentation;
   store the augmented data in at least one of the attributes; and
   retrieve the augmented data from the at least one of the attributes storing the augmented data.

9. The apparatus of claim 8, wherein the processor is further configured to configure the attributes of the resource associated with the data augmentation based on the information.

10. The apparatus of claim 8, wherein the information includes at least one of information indicating the augmentation type, information on at least one configuration parameter required for an augmenting operation, information on the original data, and information on the resource that will store the augmented data.

11. The apparatus of claim 10, wherein the information indicating the augmentation type is configured to indicate at least one of flipping, rotation, shearing, cropping, scaling, and color adjustment.

12. The apparatus of claim 10, wherein a format of the information on the at least one configuration parameter required for the augmenting operation becomes different according to the augmentation type indicated by the information indicating the augmentation type.

13. The apparatus of claim 10, wherein a format of the information on the at least one configuration parameter required for the augmenting operation becomes different according to the augmentation type indicated by the information indicating the augmentation type and an augmentation policy on the augmentation type.

14. The apparatus of claim 13, wherein the request message further includes an indicator indicating the augmentation policy.

* * * * *